United States Patent
O'Hara

(10) Patent No.: US 7,334,799 B2
(45) Date of Patent: Feb. 26, 2008

(54) SEALING DEVICE FOR A TURBOCHARGER

(75) Inventor: Stephen J. O'Hara, Zionsville, IN (US)

(73) Assignee: Caterpillar Inc., Peoria, IL (US)

( * ) Notice: Subject to any disclaimer, the term of this patent is extended or adjusted under 35 U.S.C. 154(b) by 364 days.

(21) Appl. No.: 10/328,735

(22) Filed: Dec. 23, 2002

(65) Prior Publication Data

US 2004/0120835 A1     Jun. 24, 2004

(51) Int. Cl.
F16J 15/34     (2006.01)
F04D 29/12     (2006.01)

(52) U.S. Cl. ............ 277/361; 277/363; 277/391; 277/385; 415/113; 415/231

(58) Field of Classification Search ........... 277/361, 277/385, 398, 579, 392, 581, 365; 415/113, 415/231
See application file for complete search history.

(56) References Cited

U.S. PATENT DOCUMENTS

| | | | | | |
|---|---|---|---|---|---|
| 1,792,682 | A | * | 2/1931 | Eberhard | 74/390 |
| 1,897,937 | A | * | 2/1933 | Joyce | 384/141 |
| 2,000,341 | A | * | 5/1935 | Larsh | 277/391 |
| 2,195,877 | A | * | 4/1940 | Steedman | 277/361 |
| 2,277,771 | A | * | 3/1942 | McNab | 277/363 |
| 2,299,590 | A | * | 10/1942 | Reynolds | 277/353 |
| 2,347,118 | A | * | 4/1944 | Matter | 277/372 |
| 2,383,667 | A | * | 8/1945 | Matter | 277/366 |
| 2,912,265 | A | * | 11/1959 | Brummer | 277/363 |
| 2,978,264 | A | * | 4/1961 | Campbell | 384/141 |
| 3,268,232 | A | * | 8/1966 | Richards | 277/581 |
| 3,515,394 | A | * | 6/1970 | Stevens | 277/391 |
| 3,572,726 | A | * | 3/1971 | Bottoms | 277/391 |
| 3,582,091 | A | * | 6/1971 | Smith | 277/393 |
| 4,095,808 | A | * | 6/1978 | Glasson | 277/372 |
| 4,622,815 | A | * | 11/1986 | Piesche | 60/602 |
| 5,011,166 | A | * | 4/1991 | Watts | 277/379 |
| 6,773,017 | B2 | * | 8/2004 | Henningson | 277/391 |
| 2003/0129888 | A1 | * | 7/2003 | Nakajima et al. | 440/88 A |

FOREIGN PATENT DOCUMENTS

WO     WO 91/03626     3/1991

* cited by examiner

*Primary Examiner*—Alison K Pickard
(74) *Attorney, Agent, or Firm*—Finnegan, Henderson, Farabow, Garrett & Dunner

(57) ABSTRACT

A sealing device has a seal ring and a cylindrical bellows portion connected to the seal ring. The cylindrical bellows portion has a corrugated outer surface. A turbocharger utilizing the sealing device has a turbine wheel connected to a shaft and a compressor wheel connected to the shaft. The sealing device is sealingly engaged with the shaft. The sealing device provides a seal between a bearing housing of the turbocharger and either a turbine housing or a compressor housing.

20 Claims, 2 Drawing Sheets

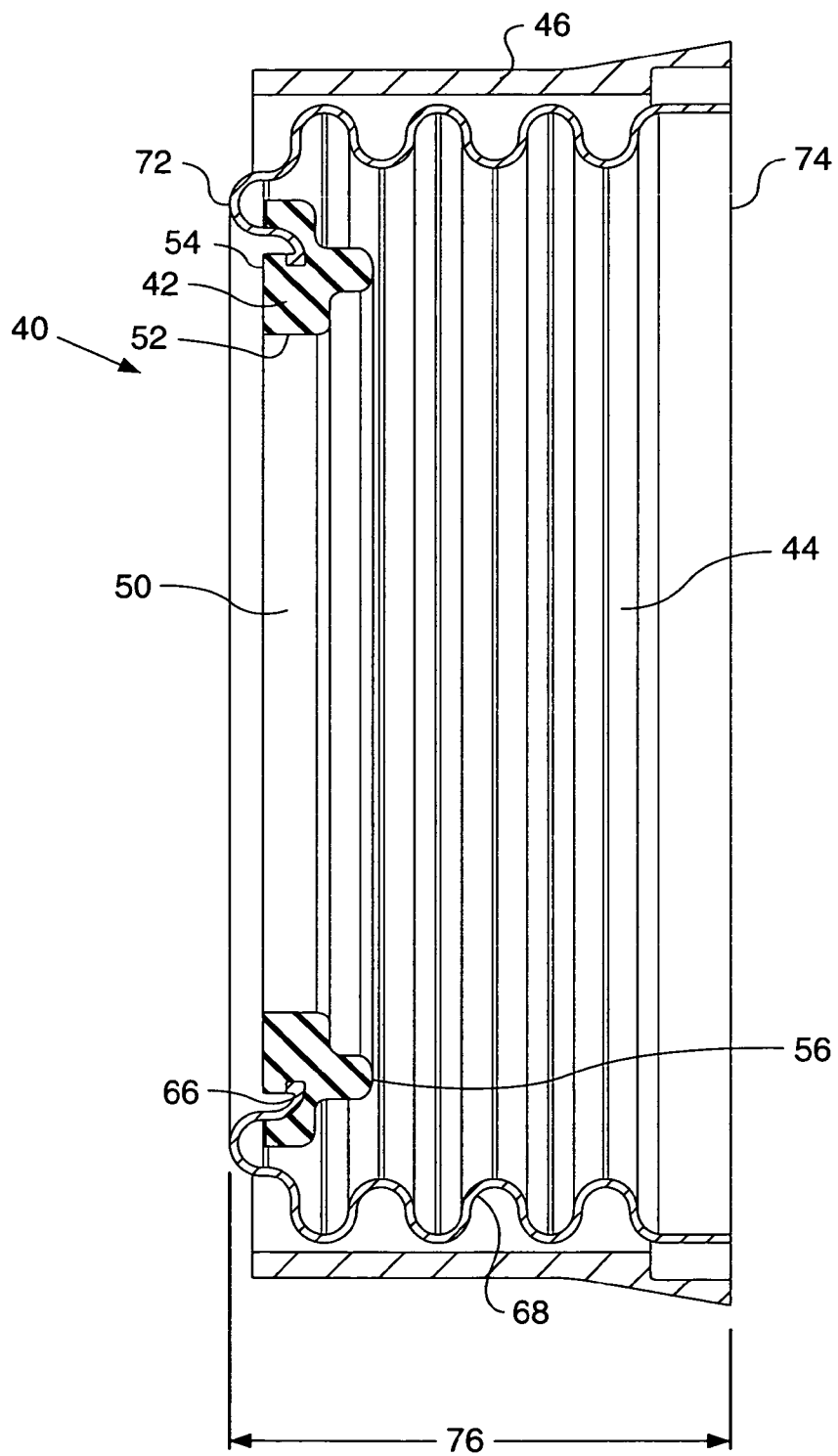

SEALING DEVICE FOR A TURBOCHARGER

TECHNICAL FIELD

This invention relates generally to sealing devices, and more particularly to a sealing device for use with a turbocharger.

BACKGROUND

The use of turbochargers in internal combustion engines is well known. Turbochargers increase the mass of air supplied to the engine thereby enabling the increase of the power output of the engine. In addition, the efficiency of the engine is increased by the turbocharger's utilization of the thermal energy contained in the engine's exhaust gases.

Turbochargers typically have a turbine wheel connected by a rotatable shaft to a compressor wheel. The turbine wheel is contained within a turbine housing and is driven at speeds of up to 200,000 r.p.m. by engine exhaust gases. The turbine wheel operates at a relatively high temperature. The common shaft in turn drives the compressor wheel at a similar speed, forcing air into the engine. The compressor wheel is contained within a compressor housing, and the compressor wheel typically operates at a lower temperature than the turbine wheel.

The shaft is lubricated along its length between the compressor wheel and the turbine wheel. The portion of the shaft between the compressor wheel and the turbine wheel is contained within a bearing housing. Shaft is rotatably connected to center housing via bearings contained within bearing housings. Seals are used around the shaft, both to prevent leakage of oil from the bearing housing into the compressor housing and turbine housing and to prevent leakage of gases from the compressor housing and turbine housing into the bearing housing. If oil leaks from the bearing housing into the compressor housing or turbine housing, unwanted emissions will likely result from the engine, including oil or black smoke. On the other hand, if exhaust gases leak from the turbine housing into the bearing housing, known as "blowby," the exhaust gases may contaminate the oil, therefore reducing the oil's ability to cool the engine and necessitating early replacement of the oil. Also, blowby can have detrimental effect on the sealing of a crankcase of the engine and on a crankcase closed-circuit ventilation system.

Due to the high temperature of the turbine wheel, turbine housing seals must be able to operate effectively at high temperatures. It has become more difficult for seals to effectively seal the turbine housings of today's engines due to the recent drive by engine manufacturers to create higher-powered, more efficient engines. This drive has resulted in higher engine exhaust temperatures and, therefore, higher temperatures within turbine housings. Because of the temperatures and speeds involved, rubber seals do not effectively seal turbine housings.

One type of seal that is commonly used to prevent blowby and oil leakage employs metal sealing rings similar to the piston ring seals used between pistons and cylinders of engines. With such seals, a metal ring of substantially square or rectangular cross-section is fitted into a similarly shaped annular groove in the rotating shaft. Although this type of seal generally works well, allowance has to be made for a certain amount of misalignment, and accordingly, a clearance between the metal ring seal and the groove must be factored into the seal dimensions. Therefore, the seal is not optimally connected to the shaft. There is also a radial split or gap in the ring, reducing the effectiveness of the seal. In addition, to use such a seal, a groove must be manufactured into the shaft. This manufacturing process adds time and expense to the overall turbocharger manufacturing process.

Another type of turbocharger seal is disclosed in international patent application # WO 91/03626, published on Mar. 21, 1991. This seal has a annular seal connected to an elastic diaphragm. The annular seal surrounds the shaft, and the elastic diaphragm urges the seal into contact with one of two sides of an annular groove. Therefore, use of this seal requires the manufacturing of a groove into the shaft. In addition, the ability of this seal to effectively seal a high temperature turbine housing is questionable.

The sealing device of the present invention solves one or more of the problems set forth above.

SUMMARY OF THE INVENTION

A sealing device has a seal ring and a cylindrical bellows portion connected to the seal ring. The bellows portion has a corrugated outer surface.

A turbocharger has a turbine wheel, a shaft, a compressor wheel, and a sealing device. The shaft has a first portion and a second portion spaced from the first portion. The turbine wheel is connected to the first portion of the shaft, and the compressor wheel is connected to the second portion of the shaft. The sealing device sealingly engaged with the shaft. The sealing device has a seal ring and a bellows portion. The bellows portion has a corrugated outer surface.

A method of sealing a turbocharger includes providing a sealing device having a seal ring and a cylindrical bellows portion connected to the seal ring. The seal ring has a bore. A shaft is inserted through the bore. The sealing device is connected to a bearing housing of the turbocharger.

BRIEF DESCRIPTION OF THE DRAWINGS

FIG. 2 is a cross-sectional view of the sealing device of FIG. 1.

DETAILED DESCRIPTION

Figure 1:
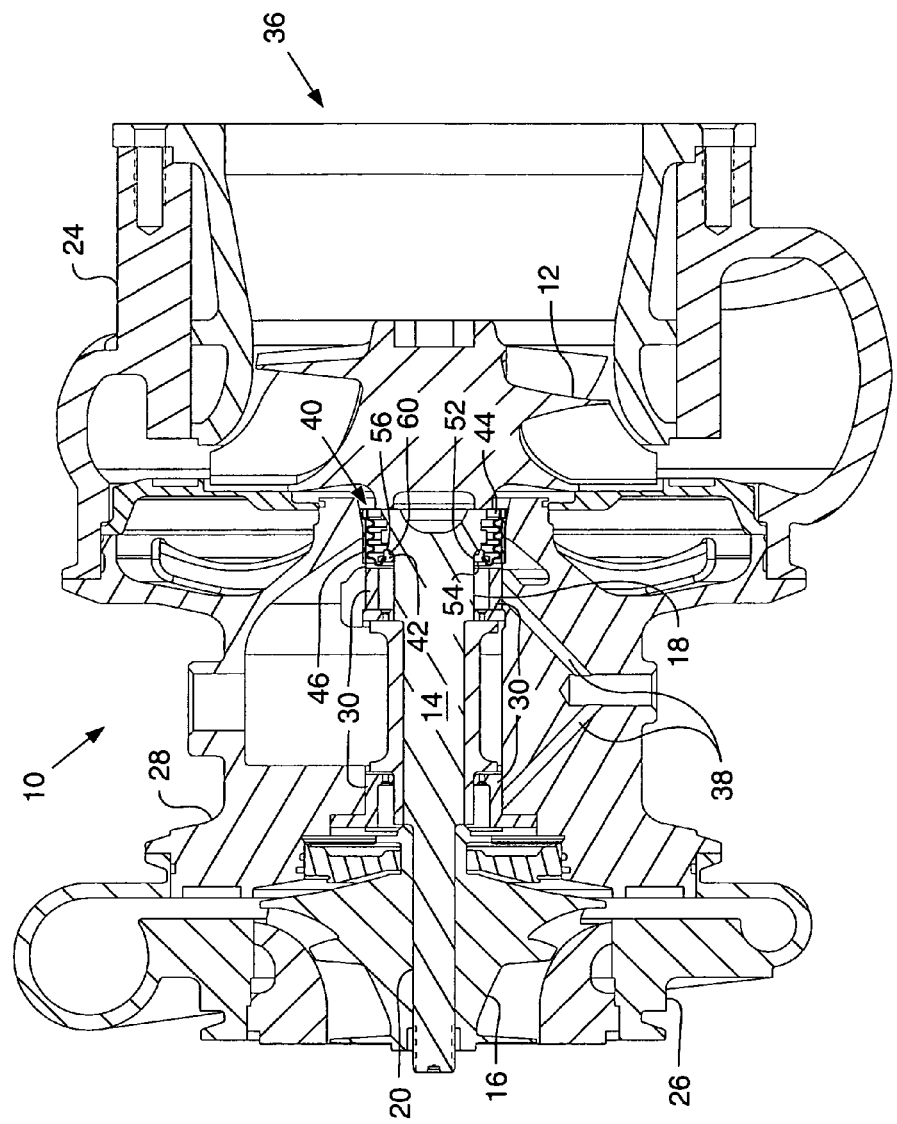
FIG. 1 is a cross-sectional view of a turbocharger having a sealing device.

Referring to FIG. 1, a turbocharger 10 has a turbine wheel 12, a rotatable shaft 14, and a compressor wheel 16. The shaft 14 has a first portion 18 and a second portion 20 spaced from first portion 18. Shaft 14 has an outer surface 22. Turbine wheel 12 is connected to first portion 18 of shaft 14, and compressor wheel 16 is connected to second portion 20 of shaft 14. Turbine wheel 12 is contained within a turbine housing 24, and compressor wheel 16 is contained within a compressor housing 26. A bearing housing 28 is located between and connected to turbine housing 24 and compressor housing 26. Shaft 14 is rotatably connected to bearing housing 28 via bearings 30 contained within bearing housing 28.

Turbine housing 24 is in fluid communication with exhaust gases of an engine 36. Compressor housing 26 is in fluid communication with intake gases of engine 36. Shaft 14 is lubricated by a fluid, typically oil, that is provided by passages 38 in bearing housing 28. A turbine housing pressure exists within turbine housing 24, the magnitude of which is dependent upon the operating conditions of engine 36. Likewise, a compressor housing pressure exists within compressor housing 26, the magnitude of which is dependent upon the operating conditions of engine 36. A bearing housing pressure exists within bearing housing 28, the magnitude of which is dependent upon the pressure of the fluid provided to the bearing housing 28 via passages 38. A pressure differential is often present between the compressor housing pressure, the bearing housing pressure, and the compressor housing pressure.

When the turbine housing pressure is greater than the bearing housing pressure, exhaust gases may be forced from turbine housing 24 into bearing housing 28. When the bearing housing pressure is greater than the turbine housing pressure, fluid from bearing housing 28 may be forced into turbine housing 24. Similarly, when the compressor housing pressure is greater than the bearing housing pressure, intake gases may be forced from compressor housing 26 into bearing housing 28. When the bearing housing pressure is greater than the compressor housing pressure, fluid from bearing housing 28 may be forced into compressor housing 26.

A sealing device 40 is sealingly engaged with shaft 14 to create a seal that prevents exhaust gases from turbine housing 24 from entering bearing housing 28 and prevents fluid from bearing housing 28 from entering turbine housing 24. Referring to FIG. 2, sealing device 40 has a seal ring 42, a bellows portion 44, and a carrier portion 46. Seal ring 42 is annular and has a central axis. Seal ring 42 has a bore 50 surrounded by an inner surface 52. Bore 50 is dimensioned to accept shaft 14, and, as shown in FIG. 1, shaft 14 extends through bore 50 such that inner surface 52 is in contact with outer surface 22 of shaft 14. Seal ring 42 has a first surface 54 and a second surface 56 spaced from first surface 54. As shown in FIG. 1, first surface 54 may be in contact with bearing 30. Second surface 56 of seal ring 42 may be in contact with a boss 60 of shaft 14. In an alternative embodiment, second surface 56 of seal ring 42 may be in contact with a hub of turbine wheel 12. Seal ring 42 may be composed of any material capable of providing an effective seal at high temperatures and pressures. In one embodiment, seal ring 42 is composed of bronze. In another embodiment, seal ring 42 is composed of carbon graphite.

Referring to FIG. 2, bellows portion 44 is connected to seal ring 42. In the embodiment of FIG. 2, bellows portion 44 is connected to seal ring 42 via a groove 66 in first surface 54 of seal ring 42. However, in other embodiments bellows portion 44 may be connected to seal ring 42 in other locations or other manners. Bellows portion 44 is cylindrical and has a corrugated outer surface 68. As used herein, corrugated shall mean "having folds or having alternating ridges and grooves." In one embodiment, bellows portion 44 has a central axis that is parallel with central axis of seal ring 42. Bellows portion 44 has a first end 72 and a second end 74 spaced a first distance 76 from first end 72. First distance 76 defines a length of bellows portion 44. Bellows portion 44 is adapted to change the magnitude of first distance 76. In other words, the corrugated outer surface 68 may compress or extend to bring first end 72 closer to or farther from, respectively, second end 74. In the embodiment of FIG. 2, first end 72 of bellows portion 44 is corrugated. Such corrugation of first end 72 permits first end 72 of bellows portion 44 to adjust and force inner surface 52 of seal ring 42 against shaft 14. Bellows portion 44 may be composed of any material capable of adapting its length and withstanding high temperatures and pressures. In one embodiment, bellows portion 44 is composed of metal.

In the embodiments of FIGS. 1 and 2, carrier portion 46 of sealing device 40 surrounds bellows portion 44. Carrier portion 46 is cylindrical and is dimensioned to engage bearing housing 28. Bellows portion 44 may be composed of a material capable of withstanding high pressures and temperatures, such as a metal.

INDUSTRIAL APPLICABILITY

Sealing device 40 maintains an effective seal between turbine housing 24 and bearing housing 28. A sealing surface is created by the contact between inner surface 52 of seal ring 42 and outer surface 22 of shaft 14. The contact between inner surface 52 of seal ring 42 and outer surface 22 of shaft 14 is maintained despite any eccentric movement of shaft 14. This contact is maintained by the force of seal ring 42 in the direction of shaft 14 provided by bellows portion 44. In one embodiment, this force is accomplished via corrugation in first end 72 of bellows portion 44. Sealing device 40 need not be installed in a shaft groove. While seals that are placed in grooved depend upon the walls of the groove to provide sealing surfaces, sealing device 40 provides a sealing surface between inner surface 52 of seal ring 42 and outer surface 22 of shaft 14. Therefore, the time-consuming and expensive method of manufacturing a groove within shaft 14 need not be done to utilize sealing device 40.

Another sealing surface of one embodiment of turbocharger 10 having sealing device 40 may be created when a pressure differential exists between turbine housing 24 and bearing housing 28, such that the bearing housing pressure is greater than the turbine housing pressure. The higher bearing housing pressure causes the length of bellows portion 44 to decrease, thereby forcing second surface 56 of seal ring 42 against boss 60 of shaft 14. As this pressure differential between bearing housing 28 and turbine housing 24 increases, the force against second surface 56 of seal ring 42 urging it towards boss 60 of shaft 14 increases. Therefore, the greater the pressure that is trying to force fluid from bearing housing 28 into turbine housing 24, the greater the pressure sealing turbine housing 24. Second surface 56 of seal ring 42 is maintained in contact with boss 60 of shaft 14.

Another sealing surface of one embodiment of turbocharger 10 having sealing device 40 may be created when a pressure differential exists between turbine housing 24 and bearing housing 28, such that the turbine housing pressure is greater than the bearing housing pressure. The higher turbine housing pressure causes the length of bellows portion 44 to increase, thereby forcing first surface 54 of seal ring 42 against bearing 30. As this pressure differential between turbine housing 24 and bearing housing 28 increases, the force against first surface 54 of seal ring 42 urging it towards bearing 30 increases. Therefore, the greater the pressure that is trying to force exhaust gases into bearing housing 28, the greater the pressure sealing bearing housing 28. First surface 54 of seal ring 42 is maintained in contact with bearing 30.

Sealing device 40 may be installed upon turbocharger 10 such that, in its initial state, the length of bellows portion 44 is compressed. In such a condition, bellows portion 44 attempts to regain its original length and, in so doing, provides a positive force urging first surface 54 of seal ring 42 against bearing 30. Therefore, contact is maintained between first surface 54 of seal ring 42 and bearing 30 when no pressure differential exists between turbine housing 24 and bearing housing 28.

In an alternative embodiment, sealing device 40 may be installed upon turbocharger 10 such that, in its initial state, the length of bellows portion 44 is extended. In such a condition, bellows portion 44 attempts to regain its original length and, in so doing, provides a positive force urging second surface 56 of seal ring 42 against boss 60 of shaft 14.

Therefore, contact is maintained between second surface 56 of seal ring 42 and boss 60 of shaft 14 when no pressure differential exists between turbine housing 24 and bearing housing 28.

Turbocharger 10 may be assembled by providing sealing device 40 and inserting shaft 14 through bore 50 of seal ring 42. Sealing device 40 is connected to bearing housing 28. One method of attaching sealing device 40 to bearing housing 28 includes connecting carrier portion 46 to bearing housing 28. One of ordinary skill in the art will readily recognize that turbocharger 10 may be assembled using other methods. Also, one of ordinary skill in the art will recognize that sealing device 40 may also be used to provide a seal that prevents intake gases from compressor housing 26 from entering bearing housing 28 and prevents fluid from bearing housing 28 from entering compressor housing 26.

Other aspects, objects, and advantages of this invention can be obtained from a study of the drawings, the disclosure, and the appended claims.

What is claimed is:

1. A sealing device comprising:
    a seal ring having three sealing surfaces; and
    a cylindrical bellows portion connected to said seal ring, said bellows portion having a corrugated radial outer surfaces;
    wherein the seal ring is configured to selectively operate among a first, second and third mode, the first mode including a first one of the three sealing surfaces engaged with a first radially extending surface and a second one of the three sealing surfaces disengaged from a second radially extending surface, the second mode including the first sealing surface disengaged from the first radially extending surface and the second sealing surface engaged with the second radially extending surface, and the third mode including each of the first and second sealing surfaces disengaged from the first and second radially extending surfaces.

2. The sealing device of claim 1 further including a cylindrical carrier portion surrounding said bellows portion.

3. The sealing device of claim 1 wherein said seal ring has a bore dimensioned to accept a shaft of a turbocharger and a third one of the three sealing surfaces includes an axially extending surface.

4. The sealing device of claim 1 wherein said seal ring is composed of at least one of bronze and carbon graphite.

5. The sealing device of claim 1 wherein said bellows portion is composed of metal.

6. The sealing device of claim 1 wherein said bellows portion has a first end and a second end spaced a first distance from said first end, said bellows portion adapted to change the magnitude of said first distance and selectively move the seal ring among the three modes.

7. A turbocharger comprising:
    a turbine wheel,
    a shaft having a first portion and a second portion spaced from said first portion, said first portion connected to said turbine wheel,
    a compressor wheel attached to said second portion of said shaft, and
    a sealing device sealingly engaged with an axially extending surface of said shaft and potentially sealingly engageable and disengageable with each of two radially extending surfaces, said sealing device having a seal ring and a cylindrical bellows portion connected to said seal ring, said bellows portion having a corrugated outer surface.

8. The turbocharger of claim 7 wherein said sealing device has a cylindrical carrier portion surrounding said bellows portion.

9. The turbocharger of claim 7 wherein said seal ring has a bore, said shaft of said turbocharger extending through said bore.

10. The turbocharger of claim 9 wherein said seal ring has an inner surface surrounding said bore and said bellows portion is adapted to force said inner surface of said seal ring against said shaft.

11. The turbocharger of claim 7 wherein said seal ring of said sealing device is composed of at least one of bronze and carbon graphite.

12. The turbocharger of claim 7 wherein said bellows portion of said sealing device is composed of metal.

13. The turbocharger of claim 7 wherein said turbocharger has a bearing connected to said shaft and said seal ring has a first surface selectively in contact with said bearing, said bearing forming one of said two radially extending surfaces.

14. The turbocharger of claim 13 wherein said bellows portion is adapted to force said first surface of said seal ring against said bearing.

15. The turbocharger of claim 7 wherein said ring has a second surface selectively in contact with a boss of said shaft, said boss forming one of said two radially extending surfaces.

16. The turbocharger of claim 15 wherein said bellows portion is adapted to force said second surface of said seal ring against said boss of said shaft.

17. The turbocharger of claim 7 wherein said bellows portion has a corrugated first end and a second end spaced a first distance from said first end, said bellows portion adapted to change the magnitude of said first distance.

18. A method of sealing a turbocharger comprising:
    providing a sealing device having a seal ring connected to and at least partially surrounded by a cylindrical bellows portion, said seal ring having a bore, and said bellows portion having a corrugated outer surface and a corrugated end surface, the corrugations of the outer surface and the end surface orientated to force the seal ring in directions approximately perpendicular to one another;
    connecting said sealing device to a bearing housing of a turbocharger; and
    inserting a shaft of said turbocharger through said bore of said seal ring.

19. The method of claim 18 further including adjusting a length of said bellows portion such that a first surface of said seal ring maintains contact with a bearing contained within said bearing housing.

20. The method of claim 19 wherein said adjusting said length of said bellows is caused by a change in a pressure differential between said bearing housing and a turbine housing of said turbocharger.

* * * * *

UNITED STATES PATENT AND TRADEMARK OFFICE
CERTIFICATE OF CORRECTION

| | | |
|---|---|---|
| PATENT NO. | : 7,334,799 B2 | |
| APPLICATION NO. | : 10/328735 | |
| DATED | : February 26, 2008 | |
| INVENTOR(S) | : O'Hara | |

It is certified that error appears in the above-identified patent and that said Letters Patent is hereby corrected as shown below:

Please correct the Claim as follows:
Column 5, line 25, in claim 1, delete "surfaces;" and insert -- surface; --.

Signed and Sealed this

Twenty-eighth Day of October, 2008

JON W. DUDAS
*Director of the United States Patent and Trademark Office*